United States Patent Office 3,332,777
Patented July 25, 1967

3,332,777
SILVER HALIDE EMULSION PREPARATION USING PHOSPHORIC ACID ESTERS AS FLOCCULANTS
Margit Groh-Molnár, Bourguillon, Switzerland, assignor to Ciba Limited, Basel, Switzerland, a company of Switzerland
No Drawing. Filed Dec. 19, 1963, Ser. No. 331,935
Claims priority, application Switzerland, Jan. 4, 1963, 67/63
12 Claims. (Cl. 96—94)

The present invention provides a process for the manufacture of photographic silver halide emulsions, wherein the soluble extraneous salts are removed by flocculation of the silver halide.

In manufacturing photographic silver halide emulsions a water-soluble silver salt, in most cases silver nitrate, is generally reacted with a water-soluble halide in an aqueous solution of gelatin. The resulting gelatin-silver halide emulsion contains as by-products of the double decomposition-reaction water-soluble salts which must be removed. The classic method of removing these salts consists in allowing the emulsion to cool, causing it to solidify, comminuting it and then washing it with cold water.

According to another method, called the flocculation method, the silver halide emulsion is precipitated, the supernatant solution containing salt is separated and the emulsion is once more dispersed in a gelatin solution or in another suitable layer-forming colloid.

The flocculation offers various advantages; in particular it is suitable for the manufacture of concentrated silver halide emulsions. Various methods of flocculating silver halide emulsions have already been proposed, for example flocculation with inorganic salts, such as sodium sulfate. However, a substantial amount of such salts is needed and must then be washed out again from the precipitate. Organic solvents are likewise suitable for flocculation, but this method is costly and, moreover, the precipitates obtained in this manner are very voluminous and still have a substantial content of water. Furthermore, heavy-metal salts have been proposed as flocculants, but they have the disadvantage that they harden the gelatin and the precipitates are very difficult to disperse further. Also anionic substances, such as soaps, have been proposed for use as flocculants, but residues of soap remain adhering persistently to the coagulate and, in addition, they make the emulsion liable to fogging.

Other processes are based on the use of gelatin derivatives which undergo flocculation at pH=3.5 and take the silver halide along with them. However, during the manufacture of the gelatin derivatives the reactive amino groups of gelatin, and with them the photographic and colloidal chemical properties of the gelatin, undergo changes.

The present invention is based on the observation that esters of phosphoric acid are very suitable as flocculants. Accordingly, the present invention provides an improvement of the process for the manufacture of photographic silver halide emulsions which involves flocculation, in which improved process the flocculant that is added to the gelatin-silver halide emulsion that still contains in solution the salts formed by the double-decomposition reaction between water-soluble silver salts and water-soluble halides is a partial ester derived from a phosphoric acid having the formula (1)  $H_{n+2}P_nO_{3n+1}$ where $n$ is a whole number, and an organic hydroxy compound containing 4, or, preferably, at least 5 carbon atoms.

Accordingly, there are suitable, for example, aryl esters and, especially, alkyl esters of the polyphosphoric acids, for example of the acids of the formula $H_5P_3O_{10}$ or $H_6P_4O_{13}$, and especially of pyro-phosphoric acid $H_4P_2O_7$ and above all of orthophosphoric acid $H_3PO_4$. The hydroxyl groups present in these acids, for example one or more of them, if desired the maximum number, that is to say, all but one, may be esterified. Unesterified groups may be in the form of free hydroxyl or of OM groups, where M represents a cation, advantageously of an alkali metal, for example, sodium, potassium, lithium, or the ammonium cation, including an ammonium cation derived from an amine. The alkyl esters derived from orthophosphoric acids may, for example, be of the formula (2) 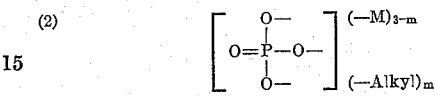

where M represents a cation, and $m=1$ or 2. If the phosphoric acid alkyl ester contains more than one cation and/or more than one alkyl group, they may be identical or different. Thus, a compound having the Formula 2, where $m=2$, may contain two different or, because of the better accessibility, two identical alkyl groups, and when $m=1$ it may be present in the form of the free acid (both M's are hydrogen atoms), of an acid salt (only one M is a hydrogen atom) or of a neutral salt (neither M represents a hydrogen atom). The phosphoric acid esters of the invention contain at least one radical of an organic hydroxy compound having at least 4 carbon atoms. When the molecule contains more than one radical of an organic hydroxy compound, such further radical may advantageously likewise contain 4, 5 or more carbon atoms but, if desired, they may contain fewer than 4 carbon atoms; for example, they may be methyl, ethyl, propyl and isopropyl groups. The alkyl radicals may be linear or branched. Good flocculating results have been obtained, for example, with dialkyl phosphoric acids containing branched alkyl radicals having a medium number, say, 5 to 8, of carbon atoms. The following are suitable examples of esters for use as flocculating agents: The phosphoric acid alkyl esters having two n-butyl, isoamyl, isooctyl, 2-ethyl-hexyl, decyl or tridecyl groups or one such group together with an ethyl or isopropyl group, and, as well, the sodium, potassium, lithium and ammonium salts of such acid esters. Thus, there may be used, for example, the following esters of orthophosphoric acid:

Phosphoric acid-mono-2-ethylhexyl ester,
Phosphoric acid-mono-isoamyl ester,
Phosphoric acid-mono-isooctyl ester,
Phosphoric acid-ethyl-lauryl ester,
Phosphoric acid-di-(2-ethylhexyl) ester,
Phosphoric acid-ethyl-oleyl ester,
Phosphoric acid-mono-stearyl ester,
Phosphoric acid-mono-n-butyl ester,
Phosphoric acid-di-(isooctyl) ester,
Phosphoric acid-isoamyl-isooctyl ester,
Phosphoric acid-octyl-phenyl ester, and
Phosphoric acid-mono-phenyl ester.

A large number of phosphoric acid esters are known and, as a class, can be manufactured by known methods. It goes without saying that in the present process mixtures of diverse phosphoric acid esters may be used.

The phosphoric acid esters may be used as flocculants in an analogous manner to flocculants at present in use. Thus, for example, they may be added to the gelatin emulsions undiluted as free hydroxy compounds (M=H) or as free hydroxy compounds in, for example, an alcoholic solution, or as alkali metal salts (M=alkali metal) in solid form or as alkali metal salts in an aqueous or alcoholic solution. The solutions of such alkali metal salts can be prepared either by dissolving the solid, for example crystalline, alkali metal salt or by combining the free hydroxy compound with an alkali metal hydroxide in water. The flocculation is preferably carried out in the following manner: The flocculant—if desired in the form of a solution, for example in ethanol—is added after physical ripening to the emulsion. As is known, the flocculation must be carried out in a certain pH range which depends in each particular case on the mechanism of the particular flocculation. Most of the known flocculants act only in an acidic medium, namely at the isoelectric point of gelation, that is to say in the case of the most frequently used types of gelatin at a pH value ranging from 4.0 to 4.5. Thus, when it is desired to flocculate an emulsion of alkaline reaction with such an agent, the pH value must be reduced to 4.0 to 4.5. There are, however, ammoniacal emulsions whose photographic properties are modified when the pH value is reduced, and in such cases it is advantageous to use a flocculant that does not require the pH value of the emulsion to be altered. Certain of the phosphoric acid esters to be used in the present process have the advantage that they are active at higher pH values. Thus it is possible to flocculate with the acid esters so-called fully-ammoniacal emulsions having a pH value within the range from 11.5 to 12 directly, that is to say, without first altering its pH value, and with some phosphoric acid esters the pH value is not changed even by the flocculation. Some of the phosphoric acid ester salts act in the alkaline range, others in the acid range. Thus, the use of the flocculants of the invention makes it easy to establish for every kind of emulsion the most suitable flocculant that facilitates flocculation without changing the pH value of the emulsion.

The most suitable temperature for flocculation will generally be found to be within the range of from 30 to 50°, although other temperatures within the range of from room temperature to 70° C. or, better, 20–50° C., may be used. The amount of flocculant needed for efficient flocculation—that is to say such as makes it easy to seprate gelatin containing the silver halides—may vary within a rather wide limits. In general it is 0.2 to 20 times, in favourable cases 0.5 to 2 times, the weight of phosphoric acid ester referred to dry gelatin.

In general, the silver halide precipitates together with the gelatin in a favorable form and deposits rapidly. The precipitates contain only a small proportion of water so that it is as a rule not necessary to wash them out any further to enable an efficient chemical ripening to be performed. If, notwithstanding this, washing out should prove necessary, the water used for washing is easy to decant. The flocculation temperature is unimportant; as a rule it is advantageously between 20 and 45° C.

The present process may be used for the manufacture of photographic silver halide emulsions of all types, more specially color material that may contain color components for the chromogenic development or image dyes for the silver dye bleaching process.

The coagulates are easy to disperse in water or in gelatin solution. For the redispersion it is possible to use also other colloids.

Example 1

An ammoniacal silver bromide gelatin emulsion is prepared in the usual manner, containing per liter the quantity of silver bromide corresponding to 50 g. of silver and 10 g. of dry gelatin and having a pH value of 12. On completion of the physical ripening orthophosphoric acid-di-(2-ethylhexyl) ester is added to the emulsion at room temperature, whereby flocculation is caused. The requisite amount of flocculant depends on the gelatin content of the aqueous silver halide dispersion and is 0.5 to 2 times the weight of gelatin present. After having removed the aqueous phase it is possible to purify the precipitate by addition of distilled water and decantation. It can be peptised—with or without addition of further amounts of gelatin—at pH=7, and the resulting emulsion is chemically ripened with the usual additives.

When, alternatively, the flocculant is added at 35 to 45° C., slightly better results were obtained. Furthermore it is possible to replace the ester containing a free hydroxyl group by the corresponding sodium or potassium salt. Finally, it is possible to separate the precipitate by suctioning or centrifuging it off the aqueous phase instead of decanting the latter.

The following table lists further phosphoric acid esters suitable for flocculating gelatin-silver halide emulsions by the method described above.

| No. | Flocculant (Orthophosphoric acid ester unless otherwise indicated) | Ratio dry gelatin: flocculant before flocculation | pH value after flocculation |
|---|---|---|---|
| 1 | Mono-n-butyl | 1:19 | 2.4 |
| 2 | Monoisoamyl | 1:17 | 2.4 |
| 3 | Mixed mono-isoamyl and di-isoamyl | 1:7 | 3.8 |
| 4 | Mixed mono- and di-2-ethylhexyl | 1:5.2 | 9.1 |
| 5 | Mono-2-ethylhexyl | 1:8.4 | 5.8 |
| 6 | Mono-isooctyl | 1:10 | 4.1 |
| 7 | Mixed mono- and di-isooctyl | 1:5 | 8.7 |
| 8 | Isoamyl-2-ethylhexyl | 1:3.6 | 9.2 |
| 9 | Isoamyl-isooctyl | 1:10 | 3.9 |
| 10 | Ethyl-oleyl | 1:1.8 | 4.2 |
| 11 | Ethyl-dodecyl | 1:19.5 | 3.1 |
| 12 | Monooctadecyl | 1:1.3 | 10.7 |
| 13 | n-Octyl-phenyl | 1:5 | 9.4 |
| 14 | Monophenyl | 1:9 | 8.3 |
| 15 | Mono-n-decyl | 1:14 | 2.8 |
| 16 | Mixed mono- and di-n-butyl | 1:22 | 1.6 |
| 17 | Mixed mono- and di-isooctyl, Na-salts | 1:7.5 | 10.3 |
| 18 | Pyrophosphoric acid-di-isoamyl ester | 1:10 | 2.9 |
| 19 | Pyrophosphoric acid-di-isooctyl ester | 1:9 | 2.0 |
| 20 | Pyrophosphoric acid-di-2-ethylhexyl ester | 1:9 | 3.1 |

Example 2

An ammoniacal emulsion having a pH value from 9.5 to 11.5 and containing, per liter, the quantity of silver bromide corresponding to 50 g. of silver and 20 g. of dry gelatin, is flocculated as described in Example 1.

Example 3

The process described in Example 1 is performed with an ammoniacal emulsion having a pH value below 9.5, but the flocculant used is either the acid ester, the sodium salt or the ammonium salt of orthophosphoric acid-di-(2-ethylhexyl) ester or a mixture of these salts. 0.2 to 20 times the weight of flocculant, referred to dry gelatin, is required. The pH value, originally about 8.5 is thereby not appreciably changed. It is possible to peptise the resulting precipitate at a pH value of 7±0.5.

Example 4

Gelatin-silver iodide-silver bromide emulsions prepared at the boil, having a pH value ranging from 6 to 7, are subjected to physical ripening and then flocculated with orthophosphoric acid-di-(2-ethylhexyl) ester or with its potassium salt; the pH value remains substantially unaffected. The amount of the phosphoric acid ester salt required is 5 to 130%, referred to the weight of dry gelatin. One or two additions of water are made to the precipitate and the water is then decanted again. Peptisation is carried out at pH=7 in water or in a gelatin solution.

Example 5

A gelatin-silver iodide-silver chloride emulsion having a pH value below 7 is processed as described in Example 3 or 4. In this process it is possible to replace the orthophosphoric acid-di-(2-ethylhexyl) ester by the orthophosphoric acid-mono-2-ethylhexyl ester or by monoisooctyl ester, or by ethyl-oleyl ester, by a mixture of ortho-phosphoric acid-mono- and -di-isoamyl ester or by a mixture of orthophosphoric acid-mono- and -di-isooctyl ester.

What is claimed is:

1. In the process for the manufacture of photographic silver halide emulsions by the flocculation method by adding a flocculant to a gelatin silver halide emulsion in which the salts formed as by-products by the double decomposition reaction of water-soluble silver salts with water-soluble halides are dissolved, the improvement which comprises adding as a flocculant a partial ester of a phosphoric acid of the formula

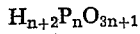

wherein $n$ is a whole number of at the most 2, and of an organic hydroxy compound selected from the group consisting of an alkanol radical containing 4 to 18 carbon atoms, an alkenol containing 4 to 18 carbon atoms and a phenol.

2. In the process for the manufacture of photographic silver halide emulsions by the flocculation method by adding a flocculant to a gelatin silver halide emulsion in which the salts formed as by-products by the double decomposition reaction of water-soluble silver salts with water-soluble halides are dissolved, the improvement which comprises adding as a flocculant a phosphoric acid ester of the formula

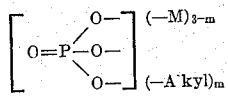

wherein M represents a cation and $m$ represents a whole number of at the most 2.

3. In the process for the manufacture of photographic silver halide emulsions by the flocculation method by adding a flocculant to a gelatin silver halide emulsion in which the salts formed as by-products by the double decomposition reaction of water-soluble silver salts with water-soluble halides are dissolved, the improvement which comprises adding as a flocculant a phosphoric acid ester of the formula

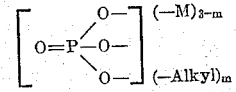

wherein M represents a cation, $m$ represents a whole number of at the most 2 and each alkyl radical contains at least 6 and at the most 18 carbon atoms.

4. In the process for the manufacture of photographic silver halide emulsions by the flocculation method by adding a flocculant to a gelatin silver halide emulsion in which the salts formed as by-products by the double decomposition reaction of water-soluble silver salts with water-soluble halides are dissolved, the improvement which comprises adding as a flocculant a phosphoric acid ester of the formula

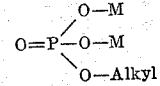

wherein M represents a cation and the alkyl radical contains at least 6 and at the most 18 carbon atoms.

5. In the process for the manufacture of photographic silver halide emulsions by the flocculation method by adding a flocculant to a gelatin silver halide emulsion in which the salts formed as by-products by the double decomposition reaction of water-soluble silver salts with water-soluble halides are dissolved, the improvement which comprises adding as a flocculant a phosphoric acid ester of the formula

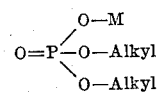

wherein M represents a cation and at least one alkyl radical contains at least 6 and at the most 18 carbon atoms.

6. In the process for the manufacture of photographic silver halide emulsions by the flocculation method by adding a flocculant to a gelatin silver halide emulsion in which the salts formed as by-products by the double decomposition reaction of water-soluble silver salts with water-soluble halides are dissolved, the improvement which comprises adding as a flocculant a mixture of phosphoric acid esters of the formulae

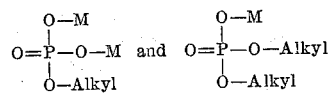

wherein M represents a cation and each alkyl radical contains at least 6 and at the most 18 carbon atoms.

7. In the process for the manufacture of photographic silver halide emulsions by the flocculation method by adding a flocculant to a gelatin silver halide emulsion in which the salts formed as by-products by the double decomposition reaction of water-soluble silver salts with water-soluble halides are dissolved, the improvement which comprises adding as a flocculant a phosphoric acid ester of the formula

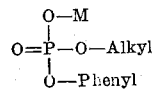

wherein M represents a cation and the alkyl radical contains at least 6 and at the most 18 carbon atoms.

8. In the process for the manufacture of photographic silver halide emulsions by the flocculation method by adding a flocculant to a gelatin silver halide emulsion in which the salts formed as by-products by the double decomposition reaction of water-soluble silver salts with water-soluble halides are dissolved, the improvement which comprises adding as a flocculant orthophosphoric acid-di-(2-ethylhexyl) ester.

9. In the process for the manufacture of photographic silver halide emulsions by the flocculation method by adding a flocculant to a gelatin silver halide emulsion in which the salts formed as by-products by the double decomposition reaction of water-soluble silver salts with water-soluble halides are dissolved, the improvement which comprises adding as a flocculant orthophosphoric acid-isoamyl-2-ethylhexyl ester.

10. In the process for the manufacture of photographic silver halide emulsions by the flocculation method by adding a flocculant to a gelatin silver halide emulsion in which the salts formed as by-products by the double decomposition reaction of water-soluble silver salts with water-soluble halides are dissolved, the improvement which comprises adding as a flocculant orthophosphoric acid-monooctadecyl ester.

11. In the process for the manufacture of photographic silver halide emulsions by the flocculation method by adding a flocculant to a gelatin silver halide emulsion in which the salts formed as by-products by the double decomposition reaction of water-soluble silver salts with water-soluble halides are dissolved, the improvement which comprises adding as a flocculant orthophosphoric acid-n-octyl-phenyl ester.

12. In the process for the manufacture of photographic silver halide emulsions by the flocculation method by adding a flocculant to a gelatin silver halide emulsion in which the salts formed as by-products by the double decomposition reaction of water-soluble silver salts with water-soluble halides are dissolved, the improvement which comprises adding as a flocculant a mixture of orthophosphoric acid-mono- and di-isooctyl esters.

References Cited
UNITED STATES PATENTS 3,258,338   6/1966   Claeys et al. _____ 96—94

NORMAN G. TORCHIN, *Primary Examiner.*

J. T. BROWN, *Assistant Examiner.*